US010070033B2

United States Patent
Tajiri (10) Patent No.: US 10,070,033 B2
(45) Date of Patent: Sep. 4, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Katsutoshi Tajiri, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/670,376

(22) Filed: Aug. 7, 2017

(65) Prior Publication Data
US 2018/0063398 A1  Mar. 1, 2018

(30) Foreign Application Priority Data
Aug. 24, 2016 (JP) .................. 2016-164067

(51) Int. Cl.
| | |
|---|---|
| *H04N 5/232* | (2006.01) |
| *H04N 7/14* | (2006.01) |
| *H04N 21/462* | (2011.01) |
| *G06F 3/03* | (2006.01) |

(52) U.S. Cl.
CPC ......... *H04N 5/232* (2013.01); *H04N 5/23206* (2013.01); *H04N 7/142* (2013.01); *G06F 3/0304* (2013.01); *H04N 21/4622* (2013.01)

(58) Field of Classification Search
None
See application file for complete search history.

(56) References Cited

U.S. PATENT DOCUMENTS

| | | | |
|---|---|---|---|
| 6,239,836 B1 | 5/2001 | Suzuki et al. | |
| 6,266,162 B1* | 7/2001 | Okamura | H04N 1/00204 358/442 |
| 2003/0093670 A1* | 5/2003 | Matsubayashi | G06F 3/1212 713/168 |
| 2007/0047950 A1* | 3/2007 | Asami | H04N 1/00347 396/429 |
| 2007/0263084 A1* | 11/2007 | Misawa | H04N 5/232 348/14.08 |
| 2009/0103148 A1* | 4/2009 | Murakami | H04N 1/00352 358/498 |

FOREIGN PATENT DOCUMENTS

| | | |
|---|---|---|
| JP | 10-164559 A | 6/1998 |
| JP | 2003069988 A | 3/2003 |
| JP | 2008098914 A | 4/2008 |

OTHER PUBLICATIONS

Japanese Office Action issued in corresponding Japanese Application No. 2016164067 dated Jul. 2, 2018.

* cited by examiner

*Primary Examiner* — James Hannett
(74) *Attorney, Agent, or Firm* — Fitzpatrick, Cella, Harper & Scinto

(57) ABSTRACT

An information processing apparatus that controls an image capturing apparatus configured to obtain a captured image by capturing a target includes a plurality of interface units each configured to receive an operation signal for the image capturing apparatus and a control unit configured to perform, when a first operation signal is received via a first interface unit of the plurality of interface units, exclusive control of not accepting a second operation signal received via the second interface unit. The control unit determines, in accordance with the type of the first operation signal, a period in which exclusive control is performed against the second operation signal.

16 Claims, 7 Drawing Sheets

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus and an information processing method and, more particularly, to the acquisition and release of a control right of a camera.

Description of the Related Art

In recent years, a distribution system of distributing shot images from a network camera by using an IP (Internet Protocol) network such as the Internet has increased. Such a distribution system has been employed in websites that distribute the statuses of ski resorts and zoos and has also been employed in monitoring stores and buildings.

Conventionally, in a distribution system using a network camera, in order to prevent a plurality of users from simultaneously changing the image processing method or the shooting condition of a camera, a camera control right is conferred to a specific user by access control. As a result, a user who can change the shooting condition is limited to a specific person. For example, in Japanese Patent Laid-Open No. 10-164559, there is disclosed a technique of determining whether the number of clients who have requested access to the image shooting apparatus is a predetermined count or more and prohibiting the control by the clients in accordance with the determination result.

In addition, cameras for commercial use which can shoot color moving images in darker environments have increased, and network distribution functions are also becoming added to these cameras for commercial use.

The camera settings of a camera for commercial use can be changed, while viewing an image, by using an operation device such as buttons of the camera main body or a remote controller accompanying the apparatus main body. Furthermore, there are various kinds of settings for a network camera such as, for example, a setting to perform an autofocus operation for a predetermined time in accordance with one operation, a setting to continuously input a plurality of operations by displaying a menu screen, and the like. However, in a conventional arrangement, since exclusive control is performed uniformly regardless of the various operation contents, there is a possibility that an interruption by another user could occur in a timing that is unexpected by the user. For example, an operation performed by another user could cause an interruption during an autofocus operation or before a plurality of operation inputs are completed by the user, and there is a possibility that an unexpected setting could be set.

SUMMARY OF THE INVENTION

The following embodiment provides, in a camera system that includes a plurality of interfaces for performing camera setting, a technique allowing a setting operation made from another interface to be suitably excluded in accordance with operation contents.

The present invention has the following configuration.

According to a first aspect of the present invention, there is provided an information processing apparatus that controls an electronic device, comprising: a reception unit configured to receive an operation signal for the electronic device; and a control unit configured to perform exclusive control of not accepting, when a first operation signal has been received via a first interface unit, a second operation signal which has been received via a second interface unit, wherein when the first operation signal is an operation signal related to a first function, the control unit performs exclusive control against the second signal for a period from the start to the end of the operation of the electronic device corresponding to the first operation signal, and when the first operation signal is an operation signal related to a second function, the control unit performs exclusive control against the second operation signal for the period from the start to the end of the operation of the electronic device corresponding to the first operation signal and a period until a predetermined time has elapsed since the end of the operation of the electronic device corresponding to the first operation signal.

According to a second aspect of the present invention, there is provided an information processing apparatus that controls an electronic device, comprising: a reception unit configured to receive an operation signal for the electronic device; and a control unit configured to perform exclusive control of not accepting, when a first operation signal has been received via a first interface unit, a second operation signal which has been received via a second interface unit, wherein, in accordance with a case in which the first operation signal is an operation signal related to a first function and a case in which the first operation signal is an operation signal related to a second function, the control unit changes a period of exclusive control against the second operation signal after an operation of the electronic device corresponding to the first operation signal has ended.

According to a third aspect of the present invention, there is provided an information processing method of an information processing apparatus that controls an electronic device, the information processing apparatus including a plurality of interface units each configured to receive an operation signal for the electronic device, the method comprising: performing, when a first operation signal has been received via a first interface unit of the plurality of interface units, exclusive processing not to accept a second operation signal which has been received via a second interface unit, wherein when the first operation signal is an operation signal related to a first function, the exclusive processing performs exclusive control against the second operation signal for a period from the start to the end of an operation of the electronic device corresponding to the first operation signal, and when the first operation signal is an operation signal related to a second function, the exclusive processing performs exclusive control against the second operation signal for the period from the start to the end of the operation of the electronic device corresponding to the first operation signal and a period until a predetermined time has elapsed since the operation of the electronic device corresponding to the first operation signal has ended.

According to a fourth aspect of the present invention, there is provided a non-transitory computer-readable storage medium that stores a program for executing an information processing method of an information processing apparatus that controls an electronic device, the information processing apparatus including a plurality of interface units each configured to receive an operation signal for the electronic device, the method comprising: performing, when a first operation signal has been received via a first interface unit of the plurality of interface units, exclusive processing not to accept a second operation signal which has been received via a second interface unit, wherein when the first operation signal is an operation signal related to a first function, the exclusive processing performs exclusive control against the second operation signal for a period from the start to the end of an operation of the electronic device corresponding to the first operation signal, and when the first operation signal is an operation signal related to a second function, the exclusive processing performs exclusive control against the second operation signal for the period from the start to the end of the operation of the electronic device corresponding to the first operation signal and a period until a predetermined time has elapsed since the operation of the electronic device corresponding to the first operation signal has ended.

Further features of the present invention will become apparent from the following description of exemplary embodiments (with reference to the attached drawings).

DESCRIPTION OF THE EMBODIMENTS

An embodiment according to the present invention will be described below with reference to the accompanying drawings.

(Camera System Arrangement)

Figure 1:
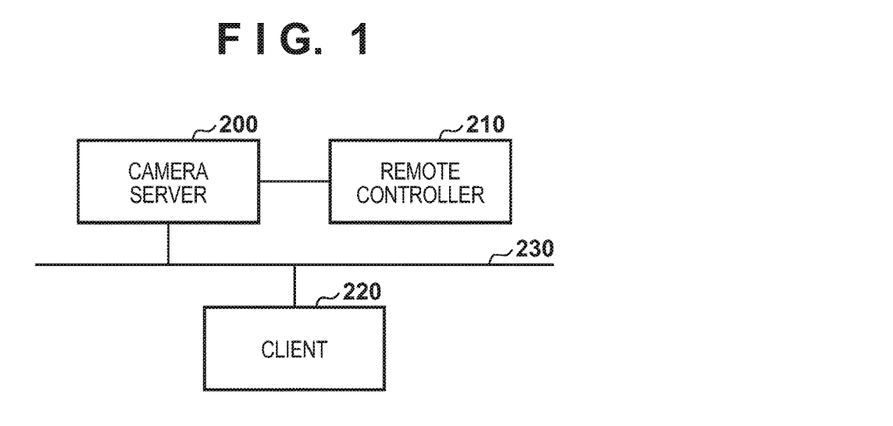
FIG. 1 is a block diagram showing an arrangement of a camera system.

FIG. 1 is a block diagram showing an arrangement of a camera system according to an embodiment of the present invention. A remote controller 210 is directly connected to a camera server 200, and the camera server 200 and a client 220 are connected to each other via a network 230. The remote controller 210 and the camera server 200 may employ a wired or wireless connection method.

The camera server 200 is an information processing apparatus that includes a camera (image capturing apparatus) and distributes, via the network 230, an image (captured image) obtained by shooting (capturing) a target. The client 220 is an information processing apparatus that accesses the camera server 200 and obtains an image. The camera server 200 and the client 220 are implemented by information processing apparatuses such as a PC (Personal Computer), an embedded device, a tablet terminal, and the like. The settings of the camera can be changed by the client 220, the remote controller 210, buttons (main body buttons) attached to the main body of the camera server 200, or the like. That is, the client 220, the remote controller 210, and the buttons (not shown) function as respective operation devices that perform an operation on a parameter.

Although only one camera server is shown in FIG. 1 for the sake of descriptive convenience, there may be two or more camera servers. In addition, there may be clients, other than the client 220, which will perform image reception and accumulation by accessing the camera server 200. The network 230 is formed by a plurality of routers, switches, cables, and the like satisfying a communication standard such as Ethernet®. In this embodiment, the communication standard, the scale, the arrangement, and the wired/wireless connection state can be set irrespectively, as long as communication between each server and client can be performed without a problem. Hence, this embodiment is applicable to any network ranging from the internet to a LAN (Local Area Network).

(Camera Server Arrangement)

Figure 2:
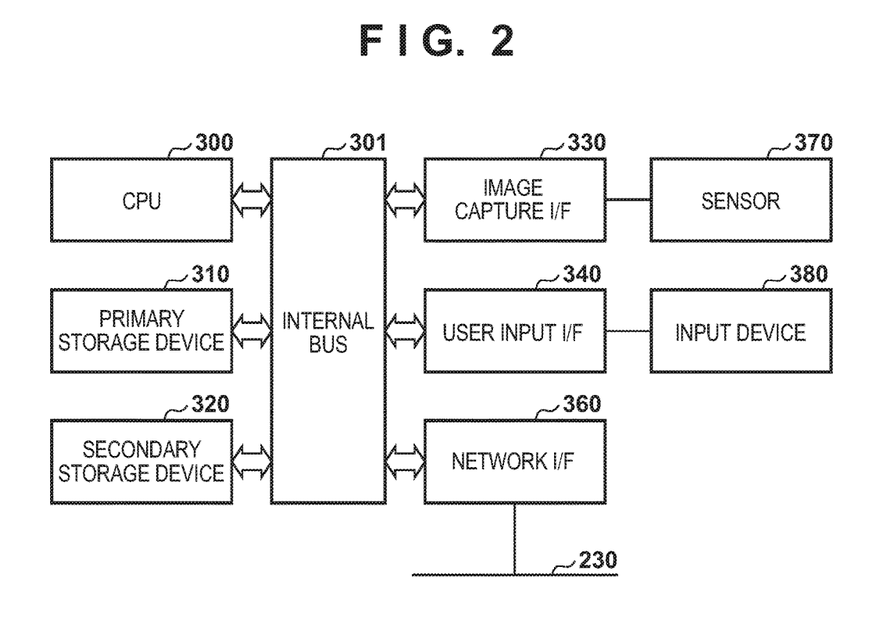
FIG. 2 is a block diagram showing a hardware arrangement of a camera server.

FIG. 2 is a block diagram showing a hardware arrangement of the camera server 200. In the camera server 200, a CPU 300, a primary storage device 310, a secondary storage device 320, an image capture I/F 330, a user input I/F 340, and a network I/F 360 are connected to each other via an internal bus 301.

Here, the primary storage device 310 is a storage device capable of rapid writing such as that represented by a RAM. An OS (Operating System), various kinds of computer programs, and various kinds of data have been loaded into the primary storage device 310, and the primary storage device 310 is also used as a work area for the OS and the various kinds of computer programs.

The secondary storage device 320 is a non-volatile storage device represented by a flash memory, an HDD (Hard Disk Drive), an SD card, or the like. Other than being used as a permanent storage area for the OS, the various kinds of computer programs, and various kinds of data, the secondary storage device 320 is also used as a storage area for various kinds of short-term data.

A detailed description of the various kinds of computer programs to be stored in the primary storage device 310 and the secondary storage device 320 of the camera server 200 will be given later.

An image sensor 370 formed from a CCD (Charge-Coupled Device) or a CMOS image sensor is connected to the image capture I/F 330. The image sensor 370 detects light and photoelectrically converts the light to obtain image data. The image sensor 370 operates as an image capturing apparatus that captures a target and obtains a captured image. The image capture I/F 330 converts and compresses the image data obtained from the image sensor 370 into a predetermined format and transfers the converted image data to the primary storage device 310.

An input device 380 such as a remote controller is connected to the user input I/F 340, and camera settings are changed by a button operation or a dial operation. The input device 380 may also be buttons or a dial attached to the main body of the camera server 200. Although the remote controller 210 or the like which provides instructions to the camera server 200 by wireless communication such as infrared communication is used as the input device 380, instructions may be transmitted via a wired connection. The network I/F 360 is an I/F (interface) to connect to the aforementioned network 230 and is in charge of communication with the client 220 via a communication medium such as Ethernet®.

FIG. 2 shows an example of an arrangement in which the camera server 200 includes the image sensor 370 which serves as a camera. However, as long as the camera server 200 can control the operation of the camera, the arrangement is not limited to this. For example, the camera may be provided independently of the camera server 200, and the operation of the camera may be controlled by communication between the camera and the camera server 200.

In addition, FIG. 2 shows an example of an arrangement in which the camera server 200 includes the user input I/F 340 and the network I/F 360. However, as long as there are a plurality of interfaces capable of transmitting/receiving signals to/from an operation device, the arrangement is not limited to that exemplified in FIG. 2. For example, a third interface using a communication method such as Bluetooth® or NFC may be provided, and an operation instruction may be accepted via this interface. Additionally, although this embodiment will describe an example in which an operation instruction from the client 220 is received via the network I/F 360, it may be set so that an operation instruction from an apparatus other than the client 220 can be accepted via the network I/F 360.

Figure 3:
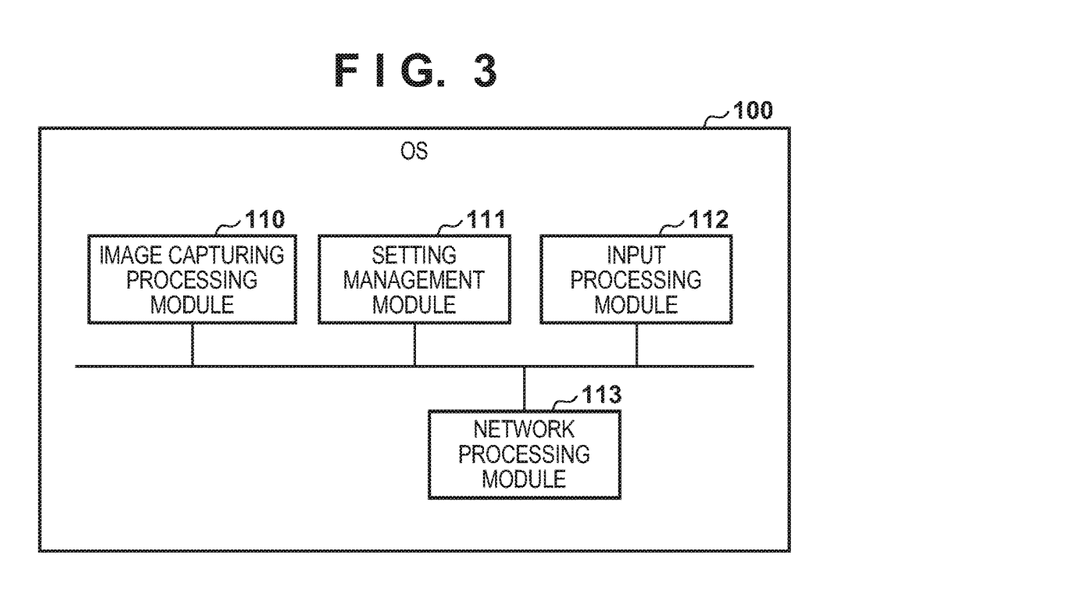
FIG. 3 is a block diagram showing a functional arrangement of the camera server.

FIG. 3 is a block diagram showing a functional arrangement of the camera server 200. In this embodiment, an example in which each functional element shown in FIG. 3 is implemented by software will be described. Each functional element of FIG. 3 is loaded as a computer program in the primary storage device 310. On the primary storage device 310, an OS 100, an image capturing processing module 110, a setting management module 111, input processing module 112, and a network processing module 113 are present.

The OS (Operating System) 100 is a basic program that controls the overall camera server 200. The image capturing processing module 110 obtains, via the image capture I/F 330, the image data generated in the image sensor 370 and performs image capturing processing on the obtained image data. The setting management module 111 performs, in addition to managing each parameter related to an image capturing condition of the image sensor 370, exclusive processing of camera settings to operations made from the network processing module 113 and input processing module 112 and requests the image capturing processing module 110 to change the camera settings. Here, image capturing conditions include not only image capturing conditions of the optical system such as a focus, an aperture, and the like, but also conditions related to switching to infrared shooting and image processing, such as white balance processing, to be performed on the captured image. In addition, exclusive processing is processing not to accept an operation when the operation has been performed by a user. That is, it is processing not to execute, even when the user performs an operation and an operation signal corresponding to the operation is input, an operation corresponding to the operation made by the user.

The input processing module 112 accepts an input operation from the input device 380, such as the main body buttons or the remote controller, via the user input I/F 340 and transfers the accepted operation information to the setting management module 111. Then, the input processing module 112 receives, from the setting management module 111, a result as to whether the operation has been accepted or has been completed. Depending on the result, the image capturing processing module 110 may be instructed to superimpose the result information on the image by OSD (On-Screen Display) or the like as needed.

In accordance with the request from the client 220, the network processing module 113 distributes image data generated by the image capturing processing module 110 or transfers the operation information included in the request to the setting management module 111 and receives a result as to whether the operation has been accepted or completed. Then, the network processing module 113 transmits the received result to the client 220. The network processing module 113 controls the network I/F 360 and performs communication with an external apparatus via the network (communication medium) 230.

Note that even in a case in which a plurality of input processing modules 112 and network processing modules 113 are provided or in a case in which there is processing to accept another interface, it may be set so that the exclusive processing is performed in the setting management module 111. Cooperation among the functional elements may be performed by using a function provided by the OS 100 as needed. Note that although the functional elements shown in FIG. 3 are implemented by software in this embodiment, some or all of the functional elements may be implemented by hardware.

(Operation Example)

Figure 4:
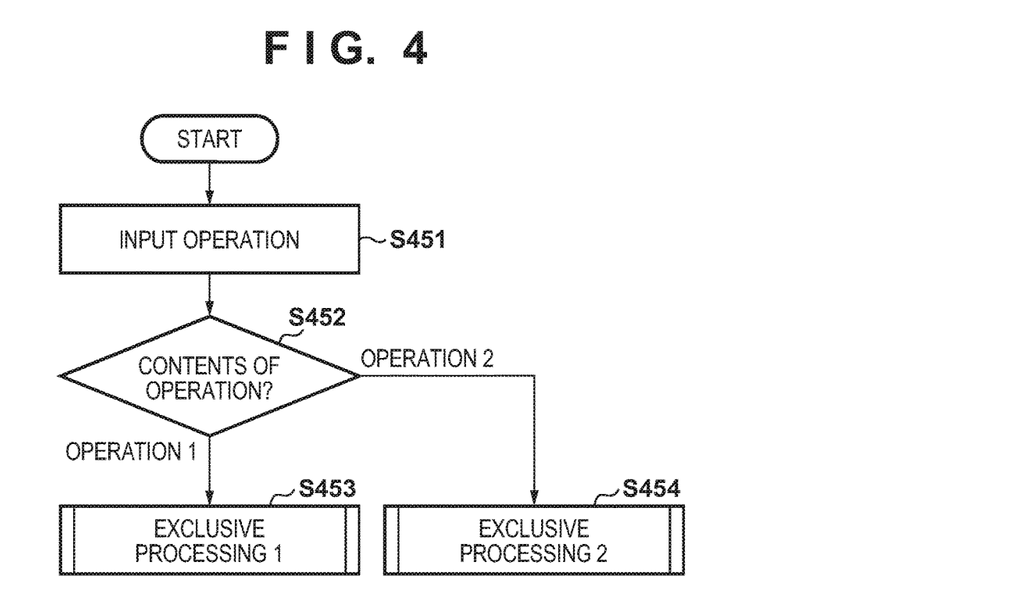
FIG. 4 is a flowchart showing a processing procedure of the camera server.

An operation example of the aforementioned camera system will be described next. In this embodiment, an example in which an operation made from the client 220 is excluded from the start to the end of an operation of the image sensor 370 based on an operation input from the remote controller 210 or until a plurality of series of operations are completed will be described. FIG. 4 is a flowchart showing the processing procedure of an operation in the camera system according to this embodiment. Each step of FIG. 4 is executed by the CPU 300 controlling the camera server 200 based on a computer program for implementing the setting management module 111.

In this embodiment, the setting management module 111 is activated when the power is turned on. Upon receiving an operation signal from the remote controller 210 via the user input I/F 340 in step S451, the camera server 200 determines the type of the received operation signal in step S452. For example, it determines whether the operation corresponding to the operation signal includes another related operation or the operation corresponding to the operation signal does not include a related operation. Then, in accordance with the determined type of operation, the exclusive processing for excluding the operation signal transmitted from the client 220 via the network I/F 360 is determined and executed (steps S453 and S454).

In this embodiment, an operation which causes an operation of the image capturing apparatus to be performed in accordance with one operation by the user or an operation which requires a predetermined time for the operation of the image capturing apparatus which is performed in accordance with the user operation will be referred to as an "operation 1". When the camera server 200 receives ("operation 1" in step S452) the operation signal of this operation 1 from the remote controller 210, the process advances to step S453. The operation of the image capturing apparatus which is to be performed in accordance with one operation can be, for example, focusing, automatic adjustment of the aperture, automatic adjustment of white balance, or switching to an infrared shooting mode. In such an operation, the possibility that the user will continuously operate is low. Hence, in step S453, during a period from the start to the end of an operation of the image capturing apparatus (image sensor 370) corresponding to the operation signal from the remote controller 210, processing (exclusive processing 1) to exclude the operation signal from the client 220 will be performed. That is, by immediately ending the exclusive processing when the operation ends, it becomes possible for another user to perform an operation. Details of the exclusive processing 1 will be given later.

Additionally, in this embodiment, an operation to continuously set one or more parameters, an operation to display a menu on a display unit, or an operation to display a menu of a specific layer on the display unit will be referred to as an "operation 2". For example, an operation to gradually change the parameters of the focus, the white balance, and the like can be the "operation 2". When the camera server 200 receives ("operation 2" in step S452) the operation signal of this operation 2 from the remote controller 210, the process advances to step S454. In such an operation, the possibility that the user will continuously operate is high. Hence, in step S454, processing (exclusive processing 2) to exclude the operation signal from the client 220 is performed until a predetermined time has elapsed since the last reception of the operation signal from the remote controller 210 and until an operation signal indicating the end of operation is received from the remote controller 210. That is, the processing to exclude the operation signal transmitted from the client 220 is performed for a period longer than the period from the start to the end of the operation of the image capturing apparatus (image sensor 370) corresponding to an operation signal. In other words, since continuous operation is highly possible even after the end of the operation corresponding to the operation, it can prevent the settings from being changed by an operation made by another user while exclusive processing is performed. An operation signal used to indicate the end of an operation includes, for example, an operation signal used for menu display or for closing a specific layer menu. Details of the exclusive processing 2 will be described later.

In this manner, the period in which exclusive control is performed on the operation signal from the client 220 is determined and applied in accordance with the type of the operation signal transmitted from the remote controller 210 in this embodiment. Hence, it is possible to prevent the operation performed from the client 220 from interrupting the operation performed from the remote controller 210 and the corresponding operation of the image capturing apparatus before they are completed, and it is possible to suitably exclude, in accordance with the operation contents, a setting operation performed from another interface.

(Exclusive Processing 1)

An operation example of the exclusive processing 1 performed by the above-described camera system will be described next. In the exclusive processing 1, exclusive control is performed on the operation signal transmitted from the client 220 for the period from the start to the end of the operation of the image capturing apparatus (image sensor 370) corresponding to the operation signal transmitted from the remote controller 210. More specifically, this embodiment will describe an example of a case in which a button operation for automatically adjusting the focus of the image sensor 370 is performed once from the remote controller 210, and control is set to be exclusive from the start (start of the operation of the image capturing apparatus) until the end (the end of the operation of the image capturing apparatus) of the focusing operation so that the operation from the client 220 is disabled. Such an operation of performing automatic adjustment of the focus of the image sensor 370 once is referred to as One Shot AF hereinafter. An example in which an input from the remote controller 210 is set to have the highest priority will be described.

In this embodiment, when an operation is requested, via a corresponding I/F, from a second operation device not having a priority higher than a first operation device while an operation is performed from the first operation device via a corresponding I/F, exclusive control is performed against the request from the second operation device. Hence, in an apparatus which includes a plurality of I/Fs (interfaces), it is possible to exclude a setting operation performed from another interface in accordance with its priority while one of the interfaces is performing a setting operation.

Figure 5:
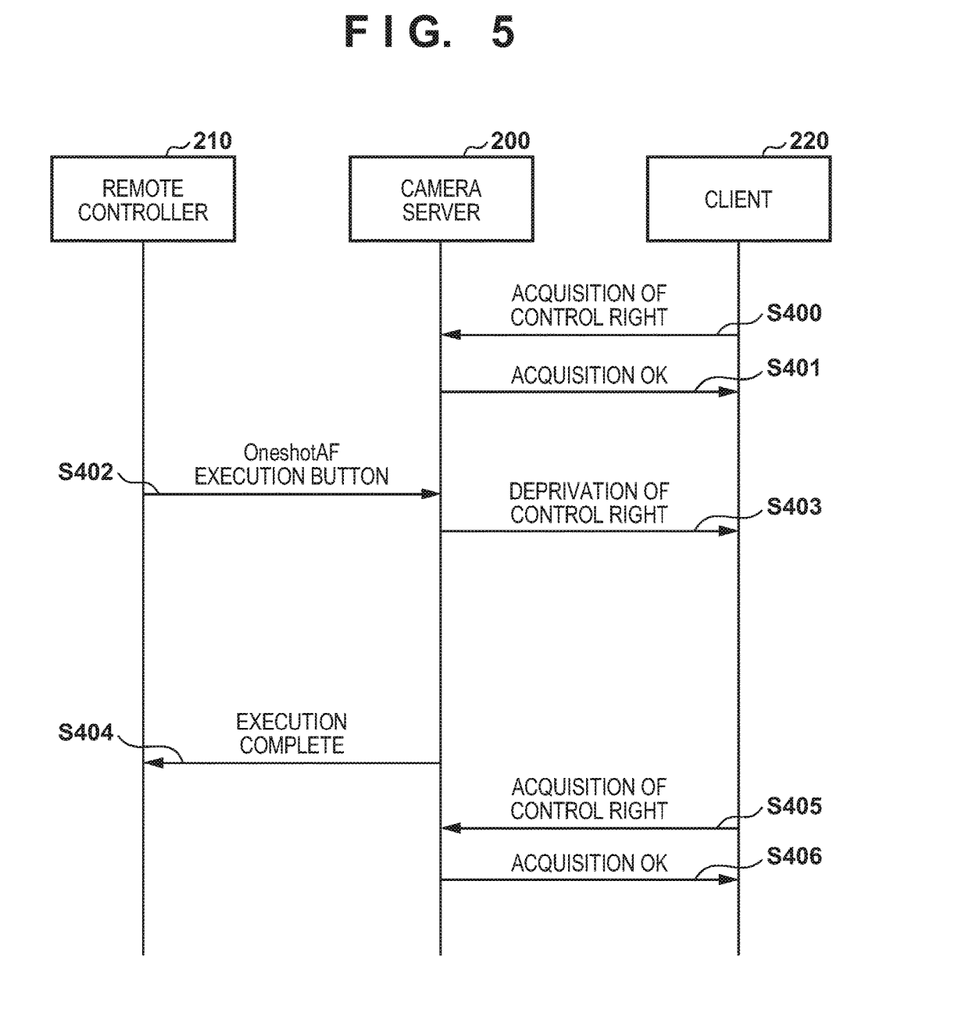
FIG. 5 is a sequence chart showing an example of a series of operations of the camera server.

FIG. 5 is a sequence chart showing an example of a series of operations of the camera server 200 in the exclusive processing 1. In this embodiment, the client 220 is first connected to the camera server 200 and requests control right acquisition (S400). The camera server 200 permits the control right acquisition since it is the first request (S401). Note that in FIG. 5, although the image obtainment processing performed by the client 220 to receive and obtain a shot image from the camera server 200 has been omitted for the sake of descriptive convenience, image obtainment may be continued constantly. After receiving a control right acquisition permission message in step S401, the client 220 can arbitrarily change the camera setting.

Next, when a One Shot AF execution button which automatically adjusts the focus (Autofocus) once is pressed in the remote controller 210 (S402), the process advances to S403. In S403, the camera server 200 deprives the client 220 of the permitted control right and executes One Shot AF. The control right is set to be exclusive during the operation of One Shot AF, and the acquisition of camera control right and changes to the camera setting performed from another interface such as the client 220 are not accepted. Although a case in which the input from the remote controller 210 is given the highest priority among the devices which may operate the camera server 200 is exemplified in this embodiment, the remote controller need not always have the highest priority. Also, in a case in which an interface having a higher priority attempts to perform control right acquisition or change the camera setting during a camera setting operation, the setting operation may be suspended or may stand by until the completion of the operation. Note that when the camera server 200 is to perform exclusive control on the client 220, it may notify the client 220 of the rejection of the operation. As a result, the client 220 can recognize that its own control right has undergone exclusive control.

When the execution of One Shot AF has been completed (S404), the camera server 200 cancels the exclusive setting of the control right and sets a state in which the control right can be acquired again by an apparatus of another interface. Although no processing is performed when the control right is released in this embodiment, the client 220 may be notified that the control right has been released.

After the release of the control right, if a control right acquisition request is transmitted from the client 220 again (S405), the camera server 200 sends back a control right acquisition permission (S406). This allows the client 220 to control the camera setting of the camera server 200 again.

Figure 6:
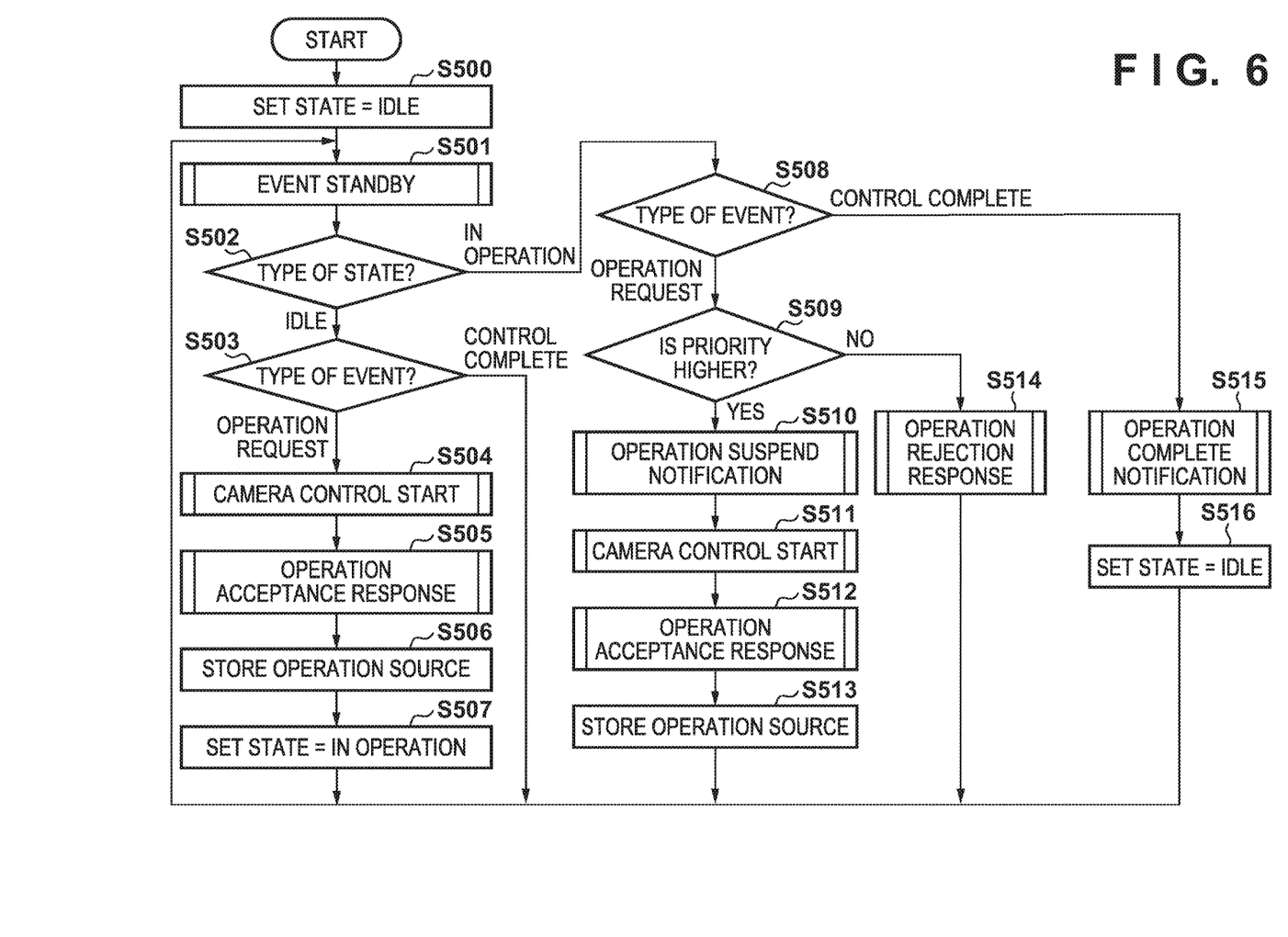
FIG. 6 is a flowchart showing another processing procedure of the camera server.

FIG. 6 is a flowchart showing the processing procedure of the exclusive processing 1 performed by the setting management module 111 of the camera server 200 according to this embodiment. Each step of FIG. 6 is executed by the CPU 300 controlling the camera server 200 based on a computer program for implementing the setting management module 111.

In this embodiment, when the setting management module 111 starts the exclusive processing 1, the program state is changed to an idle state (step S500). An idle state is a state in which neither the remote controller 210 nor the client 220 has acquired the control right and any arbitrary device or component can obtain the control right.

Next, the CPU stands by until some kind of an event is generated (step S501). When an event is generated, the CPU determines the type of the current program state (step S502). If the program state is the idle state ("idle" in step S502), the process advances to step S503. If the program state is in an in-operation state ("in operation" in step S502), the process advances to step S508.

In step S503, the CPU determines the type of the generated event. If the generated event is an operation request event ("operation request" in step S503) indicating One Shot AF from the remote controller 210, the execution of One Shot AF is requested to the image capturing processing module 110 by starting camera control (step S504).

Subsequently, an operation acceptance response is transmitted to the remote controller 210 which is the operation source (step S505), and information which indicates that the operation source is the remote controller 210 is stored (step S506). When the operation source (the remote controller 210 or the like) receives the operation acceptance response, the operation source can display the response on a user interface so that the operator can know about the response as needed. Finally, the program state is changed (step S507) to an in-operation state, the process returns to step S501, and event standby processing is restarted.

If the generated event in step S503 is a control complete event ("control complete" in step S503) or the like and not an operation request event such as One Shot AF, the process returns to step S501 without any operation, and the event standby processing is restarted.

Even when the program state is determined to be in operation in step S502 ("in operation" in step S502) and the process advances to step S508, the CPU determines first the type of the generated event (step S508). If the generated event is an operation request ("operation request" in step S508), the CPU determines whether the operation-source priority of the request is higher than that of the current operation source (step S509). If the operation-source priority is higher than that of the current operation source (YES in step S509), the process advances to step S510. Otherwise (NO in step S509), the process advances to step S514. If the operation source of the generated event is the client 220, since its priority is lower than that of the remote controller 210 in the aforementioned example, the process advances to step S514, and an operation rejection response is transmitted to the operation source (that is, the client 220). If the operation source of the generated event is the same remote controller 210, the process advances to step S510, and an operation suspend notification is transmitted to the current operation source upon accepting the request. In this manner, when a control operation performed from an operation device, which is in operation, is to be excluded in accordance with an operation request from another operation device having a higher priority, a notification is transmitted to the operation device which is the target of the exclusive processing. As a result, the operation device that receives the notification can recognize that exclusive control has been performed.

Then, the CPU requests the image capturing processing module 110 to execute a newly generated operation of One Shot AF by restarting camera control (step S511). Next, the CPU transmits the operation acceptance response to the operation source of the newly generated operation (step S512) and stores the operation source again (step S513). Subsequently, the process returns again to the event standby processing in step S501. When the operation source (client 220 or the like) has received an operation rejection response or an operation suspend notification, the operation source can display the notification on the user interface so that the operator can know about the notification as needed.

On the other hand, if the generated event is a control complete event ("control complete" in step S508) indicating the completion of the One Shot AF operation from the image capturing processing module 110, the process advances to step S515. In this case, the CPU transmits the operation complete notification to the stored operation source (step S515) and changes the program state back to the idle state (step S516), and the process returns to the event standby processing of step S501. When the operation source receives the operation complete notification, the operation source can display the notification on the user interface so that the operator can know about the notification as needed.

This embodiment described a case in which the remote controller 210 and the client 220 are present as the operation sources that operate the camera server 200 and the remote controller 210 was given higher priority. However, the present invention is not limited to this. For example, the operation source may be a device having a higher priority than the remote controller, and the priority order may be changed in accordance with the use or the purpose of the camera server 200.

Also, in the same manner, this embodiment described a case in which the focus was automatically adjusted. However, the operation contents are not limited to this. For example, for a camera setting that can be executed by performing a button operation once or an operation which takes a predetermined time or more until its completion such as an one-time automatic adjustment operation of the aperture or the white balance, or an operation to switch to the infrared shooting mode, the control right can be set to be exclusive from the start to the end of the operation.

In this manner, in the exclusive processing 1, the control right is set to be exclusive, from the start to the end of the camera setting operation, in accordance with the target item of the button operation. More specifically, when an operation is requested from a second operation device which does not have a higher priority than a first operation device while an operation of the image capturing apparatus corresponding to the operation from the first operation device is performed, exclusive control is performed on the request from the second operation device. On the other hand, when an operation is requested from a third operation device which has a higher priority than the first operation device while the operation of the image capturing apparatus corresponding to the operation from the first operation device is performed, the operation of the image capturing apparatus is suspended, and the operation from the third operation is started. Hence, in an arrangement including a plurality of interfaces, exclusive control can be performed suitably in accordance with the priority of each operation device. Therefore, the user of the camera main body can perform camera setting without being interrupted by another setting operation from a network or the like while using the buttons or the remote controller of the camera main body.

In addition, in the exclusive processing 1, exclusive control is performed against a request from the other operation device (the client 220) from the start to the end of the operation of the image capturing apparatus which is performed in accordance with an operation performed, via a corresponding interface, from the operation device (remote controller 210) having a higher priority. Hence, this can prevent the occurrence of an unpredictable operation due to interruption by the operation from the client 220 before the operation of the image capturing apparatus is completed.

(Exclusive Processing 2)

An operation example of the exclusive processing 2 of the camera system according to this embodiment will be described next. This embodiment will describe an example in which a plurality of camera settings are continuously changed by a button operation or the like, and control is set to be exclusive for a longer period from the start to the end of the setting operation.

Figure 7:
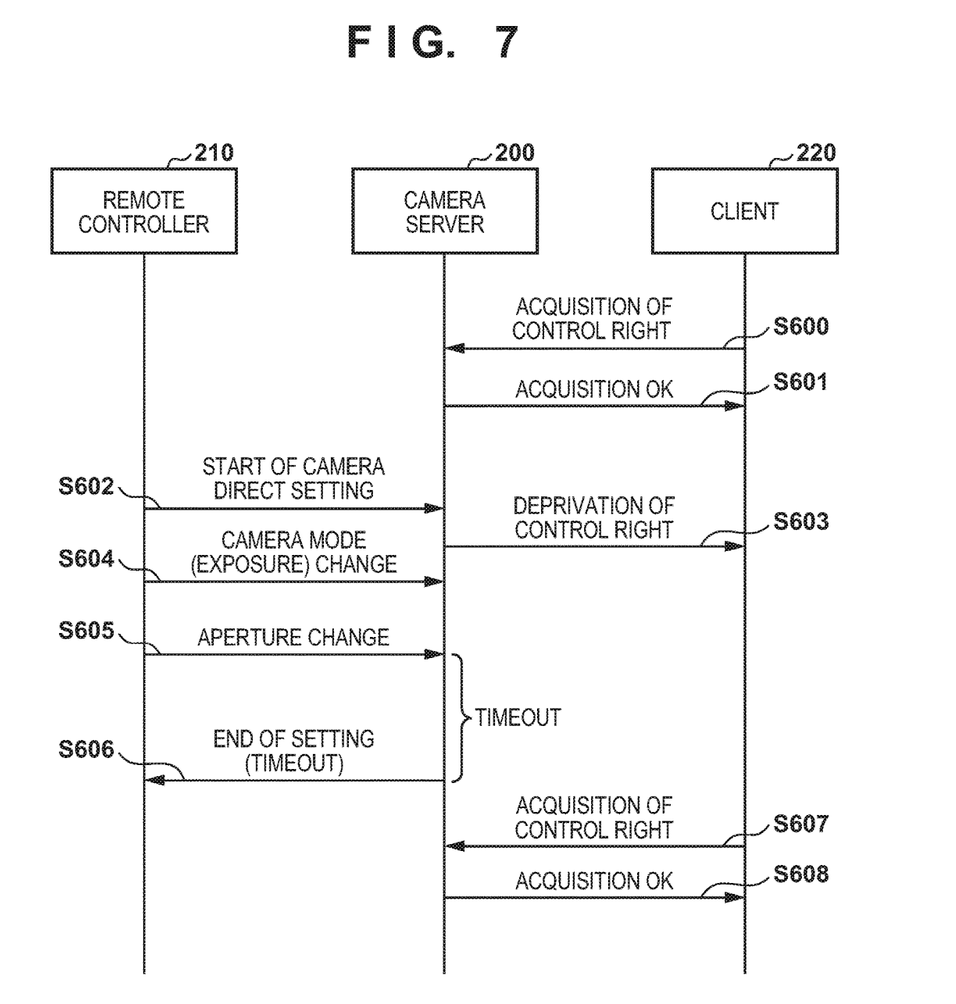
FIG. 7 is a sequence chart showing an example of another series of operations of the camera server.

FIG. 7 is a sequence chart showing an example of series of operations of the camera server 200 in the exclusive processing 2. FIG. 7 shows an example of a case in which time out processing has occurred when a plurality of camera settings including the camera mode are changed by camera direct setting. The camera direct setting is an operation to change a plurality of setting items.

In the exclusive processing 2, the client 220 is first connected to the camera server 200 and requests (S600) control right acquisition. The camera server 200 permits (S601) the acquisition of the control right since this is the first request. Note that in FIG. 7, similarly to FIG. 5, although the image obtainment processing of the client 220 has been omitted for the sake of descriptive convenience, image obtainment may be continued constantly.

The client 220 can arbitrarily change the camera settings after it receives a control right acquisition permission message in S601.

Next, when a button enabling the camera direct setting from the remote controller 210 is pressed (S602), the camera server 200 recognizes that it is an operation to change a plurality of settings and deprives the client 220 of the permitted control right (S603). Subsequently, the camera mode is changed (S604) to "manual", and the aperture is changed (S605) from the remote controller 210. This embodiment described an example in which the camera mode and the aperture were changed. However, the items to be changed are not limited to these two items and may be any of the settings.

The control right is set to be exclusive in a period in which a plurality of setting contents are changed such as in the camera direct setting, and the acquisition of the camera control right and changes to the camera setting made from another interface such as the client 220 are not accepted but rejected.

In this embodiment, the highest priority is given to the input from the remote controller. However, the highest priority need not always be given to the remote controller. Also, if an interface having a higher priority acquires the control right or changes the camera setting, the setting operation may be suspended or set on standby until the operation is completed.

Subsequently, the camera server detects a timeout after a predetermined time has elapsed without any operation from the user and cancels the camera direct setting state for performing a plurality of settings (S606). At this time, the exclusive setting of the control right is also simultaneously canceled so as to set a state in which another interface can acquire the control right again.

Although the camera server 200 does not perform any kind of processing when the control right is released in the example of FIG. 7, it may notify the client 220 of the fact that the control right has been released. After the control right has been released, if the client 220 makes a request to acquire the control right again (S607), the control right acquisition permission is returned to the client (S608). As a result, the client 220 can control the camera setting of the camera server 200 again.

Although the camera direct setting has been exemplified in this embodiment, another setting method having a period in which a plurality of camera settings are changed with a timeout can be used. Also, although the exclusive processing was canceled by the timeout of a period in which no operation input has been made in this embodiment, the exclusive processing may be canceled by another phenomenon such as the total time timeout.

Figure 8:
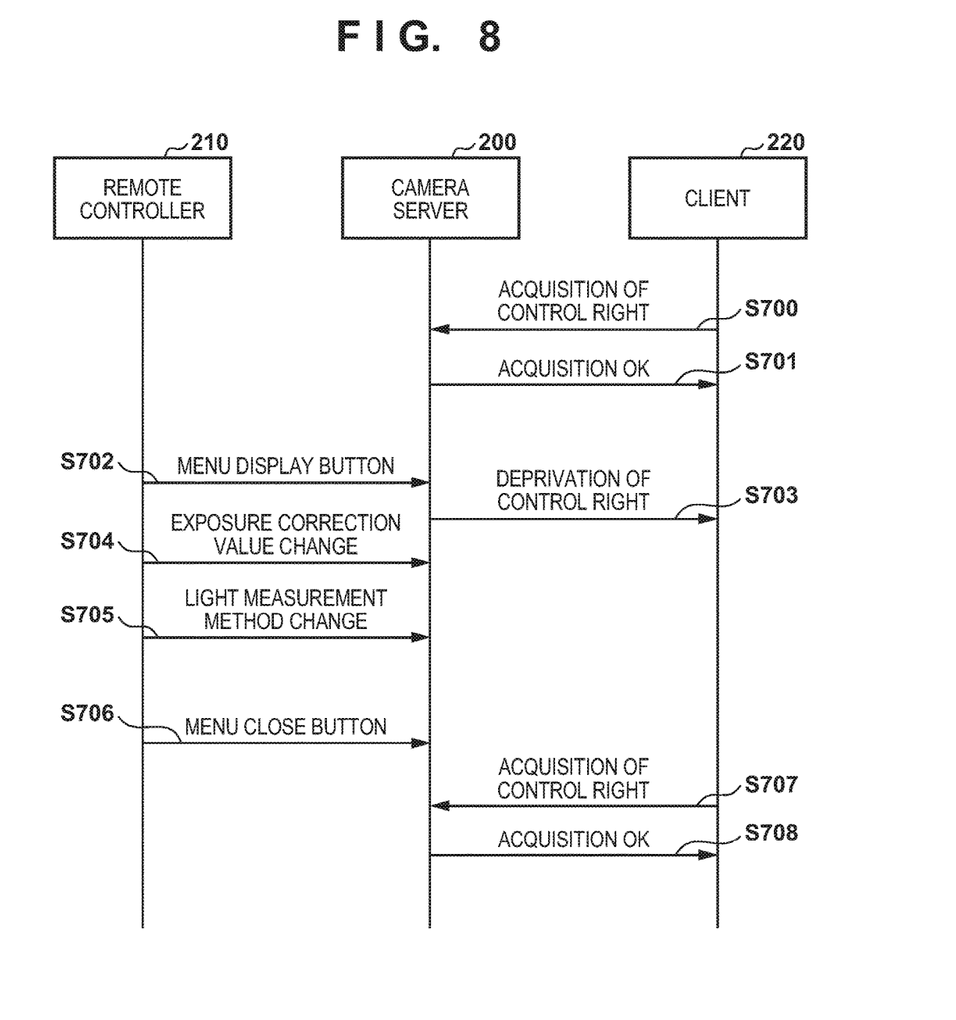
FIG. 8 is a sequence chart showing an example of yet another series of operations of the camera server.

FIG. 8 is a sequence chart showing an example of another series of operations of the camera server 200 in the exclusive processing 2. FIG. 8 shows an example in which exclusive control is performed when a plurality of camera settings are changed between an operation to display the menu and an operation to close the menu. The connection form and prerequisites are the same as those of FIG. 7, and a description thereof will be omitted. Also since steps S700 and S701 are the same as the steps S600 and S601 of FIG. 7, a description thereof will be omitted and a description will be given from step S702.

When the setting menu display button is pressed from the remote controller 210 (S702), the camera server 200 recognizes that it is an operation to change a plurality of settings and deprives the client 220 of the permitted control right (S703). Then, the exposure correction value (S704) and the light measurement method are changed via the remote controller 210 (S705). Although FIG. 8 shows an example in which the exposure correction value and the light measurement method are changed, the items to be changed are not limited to these two items, and any of the setting items may be used.

In a period in which a plurality of settings such as the setting menu are to be changed, the control right is set to be exclusive, and the acquisition of the camera control right and changes in the camera settings from another interface such as the client 220 are not accepted but rejected. Subsequently, when the user presses a button to close the setting menu in the remote controller 210, the state in which a plurality of settings are set is canceled (S706). At this time, the exclusive setting of the control right is also canceled simultaneously, and a state in which another interface can acquire the control right again is set.

Although the camera server 200 does not perform any kind of processing when the control right is released in this embodiment, it may notify the client 220 of the fact that the control right has been released. After the control right has been released, if the client 220 makes a request to acquire the control right again (S707), the camera server 200 returns the control right acquisition permission to the client (S708).

Figure 9:
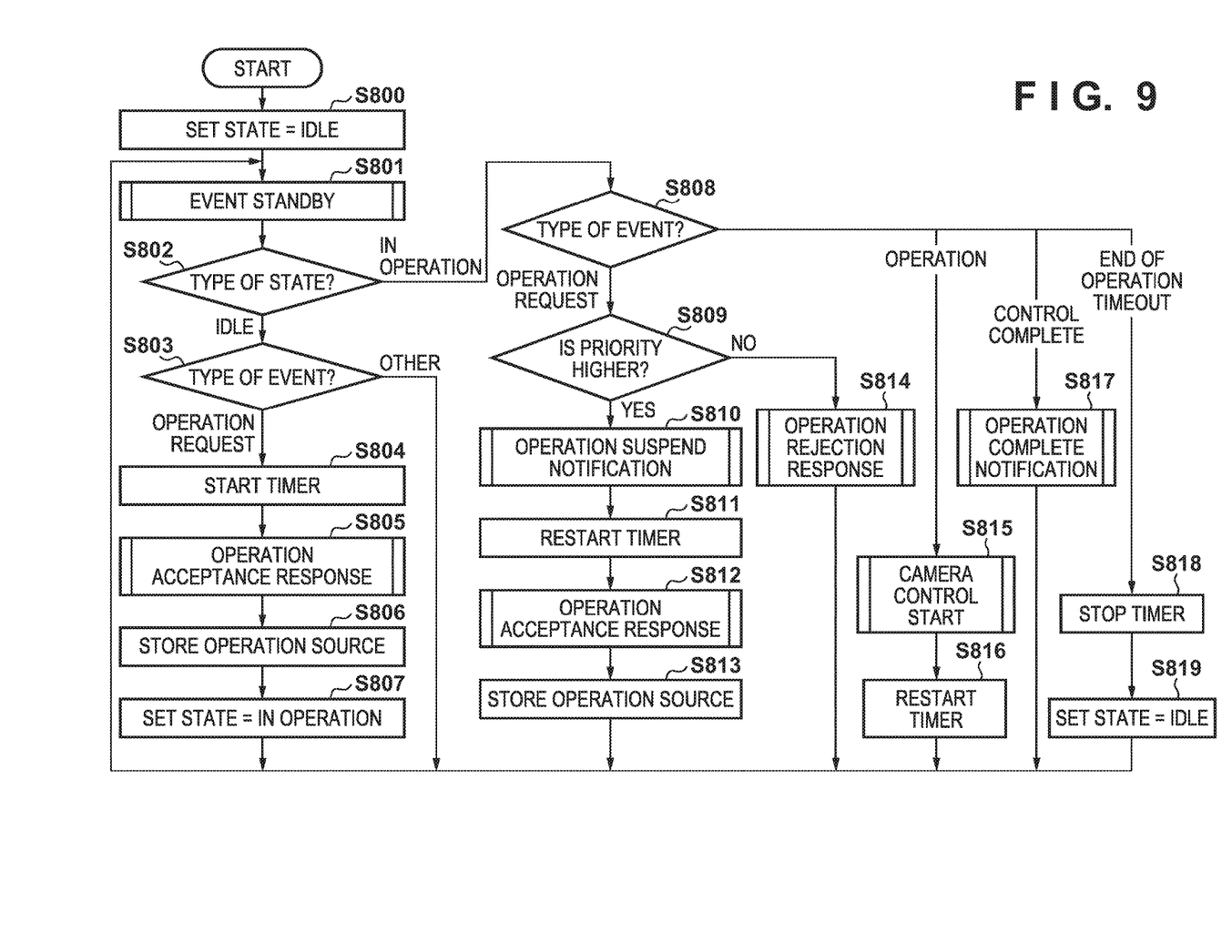
FIG. 9 is a flowchart showing yet another processing procedure of the camera server.

FIG. 9 is a flowchart of the exclusive processing 2 of the setting management module 111 according to this embodiment. Each step of FIG. 9 is executed by the CPU 300 controlling the camera server 200 based on a computer program for implementing the setting management module 111.

In this embodiment, when the setting management module 111 starts the exclusive processing 2, the program state is changed to the idle state (step S800). In the same manner as that in the exclusive processing 1, the idle state is a state in which neither the remote controller 210 nor the client 220 has the control right and the control right can be acquired by an arbitrary device or component.

Next, the CPU stands by until some kind of an event is generated (step S801). When an event is generated, the CPU determines the type of the current program state (step S802). If the program state is the idle state ("idle" in step S802), the process advances to step S803. If the program state is in an in-operation state ("in operation" in step S802), the process advances to step S808.

In step S803, the CPU determines the type of the generated event. If the generated event is an operation start event ("operation request" in step S803) indicating a menu display operation performed from the remote controller 210, the CPU starts a timer to detect a no-operation timeout (step S804). Then, the CPU transmits an operation acceptance response to the remote controller 210 which is the operation source (step S805) and stores information that the operation source is the remote controller 210 (S806). When the operation source receives the operation acceptance response, it can display the response on the user interface so that the operator can know about the response as needed. Finally, the CPU changes the program state to "in operation" (step S807), the process returns to step S801, and the event standby processing is restarted.

If the generated event is not the operation start event in step S803 ("other" in step S803), the process returns to step S801 without any change, and the event standby processing is restarted.

Also, if the program state is determined to be in operation in step S802 ("in operation" in step S802) and the process advances to step S808, the CPU determines first the type of the generated event (step S808). If the generated event is the operation start event ("operation request" in step S808), the CPU determines whether the priority of the operation source is higher than that of the current operation source (step S809). If the operation source of the generated event is the client 220, since its priority is lower than that of the remote controller 210 in this embodiment (NO in step S809), the CPU transmits an operation rejection response to the operation source (step S814). If the operation source of the generated event is a device having a higher priority than the remote controller (YES in step S809), the CPU accepts the operation request, transmits the operation suspend notification to the current operation source (step S810), stops (resets) the timer, and restarts the timer (step S811). Next, the CPU transmits the operation acceptance response to the operation source of the newly generated operation (step S812) and stores the operation source again (step S813). Subsequently, the process returns again to the event standby processing in step S801.

Although this embodiment has described an example of a case in which the remote controller 210 and the client 220 are present as devices that can operate the camera settings and in which the remote controller 210 was given higher priority than the client 220, the types and the priorities of the devices are not limited to this. For example, a device having a higher priority than the remote controller may serve as the operation source, and the order of priority may be changed in accordance with the product performance of the camera server 200. Also, although an example in which a priority is assigned to each device (operation device) has been described in this embodiment, the target for priority assignment is not limited to this. For example, a priority can be set for each interface or an operation target of each interface, and the interfaces to be excluded can be determined by considering the priority when the setting operations compete with each other. In addition, when an operation source receives the operation rejection response or the operation suspend notification, it may display the response or the notification on the user interface so that the operator can know about the response or the notification as needed.

If the generated event in step S808 is an operation event indicating an operation to change the exposure correction value or the aperture ("operation" in step S808), the CPU requests the image capturing processing module 110 to start camera control (step S815), stops (reset) the timer, and restarts the timer (step S816). Subsequently, the process returns again to the event standby processing in step S801.

If the generated event in step S808 is a camera control complete event transmitted from the image capturing processing module 110 ("control complete" in step S808), the CPU transmits an operation complete notification to the stored operation source (step S817), and the process returns to the event standby processing in step S801. When the operation source receives the operation complete notification, it can display the notification on the user interface so that the operator can know about the notification as needed.

If the generated event in step S808 is a setting end event which is an operation to close the menu display made from the remote controller 210 or is a timeout ("operation end" or "timeout" in step S808), the CPU stops the timer (step S818) and changes the program state to the idle state (step S819). Then, the process returns again to the event standby processing in step S801.

If the timeout described in FIG. 7 is unnecessary, the processes of timer start, timer restart, timer stop, and timeout may be deleted. In this embodiment, the example of "displaying/closing" the setting menu has been described. However, another setting method may be used if it is possible to explicitly know the period in which the plurality of settings are to be changed, such as when performing an operation of "entering/exiting" a specific layer of the setting menu or when operating an "enable/disable" button of a remote controller.

In this manner, in the exclusive processing 2, the control right is set to be exclusive for a longer period from the start to the end of the camera setting operation in accordance with the target items of the button operation. More specifically, exclusive control is performed against a request from another operation device (client 220) until a predetermined time has elapsed since an operation has been performed, via a corresponding interface, by an operation device (remote controller 210) having a higher priority. Hence, when using the buttons of the camera main body or the remote controller, the user can perform camera settings without being interrupted by another setting operation from the network for a predetermined time. In addition, by performing exclusive control until an instruction to end the operation such as closing the setting menu or the like is received, it can prevent another apparatus from interfering with the operation of a user while in an operating state.

As described above, in this embodiment, the processing is switched in accordance with the operation target of an assigned button by combining the exclusive processing 1 and the exclusive processing 2. Hence, an exclusive period can be suitably set in accordance with the operation target of the button, and exclusive control can be performed against an interruption from another user while the image capturing apparatus is in operation or when a series of operation inputs are incomplete. Note that although the above-described "operation 1" and "operation 2" are exemplified as the types of operation signals that are received via the corresponding interface, the types of operation signals are not limited to them. For example, an operation signal indicating the held state of the remote controller 210 may be transmitted as another type of operation signal upon detecting that the user is holding the remote controller 210, and the exclusive period may be set in accordance with the transmitted signal.

Furthermore, although the embodiments of the present invention have been described, the present invention is not limited to these embodiments, and various modifications and changes can be made without departing from the scope of the invention. According to each embodiment of the present invention, while a setting operation is performed in a camera having a plurality of interfaces capable of performing camera settings such as buttons attached to the apparatus main body or a remote controller, it is possible to exclude a setting operation made from another interface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164067, filed Aug. 24, 2016, which is hereby incorporated by reference herein in its entirety.

What is claimed is:

1. An information processing apparatus that controls an electronic device, comprising:
a reception unit configured to receive an operation signal for the electronic device; and
a control unit configured to perform exclusive control of not accepting, when a first operation signal has been received via a first interface unit, a second operation signal which has been received via a second interface unit,
wherein when the first operation signal is an operation signal related to a first function, the control unit performs exclusive control against the second signal for a period from the start to the end of the operation of the electronic device corresponding to the first operation signal, and
when the first operation signal is an operation signal related to a second function, the control unit performs exclusive control against the second operation signal for the period from the start to the end of the operation of the electronic device corresponding to the first operation signal and a period until a predetermined time has elapsed since the end of the operation of the electronic device corresponding to the first operation signal.

2. The apparatus according to claim 1, wherein the operation signal related to the first function is an operation signal by which the operation of the electronic device is performed in accordance with one operation performed by a user.

3. The apparatus according to claim 2, wherein the electronic device is an image capturing apparatus that obtains a captured image by capturing a target, and
an operation of the image capturing apparatus which is performed in accordance with the one operation is an automatic adjustment of a focus, an aperture, or white balance, or switching of an infrared shooting mode.

4. The apparatus according to claim 1, wherein the operation signal related to the second function is an operation signal for continuous setting of parameters.

5. The apparatus according to claim 1, wherein when the first operation signal is an operation signal related to a third function, the control unit performs exclusive control against the second operation signal for a period until the first operation signal indicating the end of an operation is received.

6. The apparatus according to claim 5, wherein the operation signal related to the third function is an operation signal indicating the start of an operation to continuously set parameters.

7. The apparatus according to claim 5, wherein the operation signal related to the third function is an operation signal for displaying a menu on a display unit, and the first operation signal indicating the end of the operation is an operation signal for closing the menu.

8. The apparatus according to claim 5, wherein the operation signal related to the third function is an operation signal for displaying a menu of a specific layer on a display unit, and
the first operation signal indicating the end of the operation is an operation signal for closing the menu of the specific layer.

9. The apparatus according to claim 1, wherein each of the first and second interface units is assigned with a priority, and
when the control unit receives, while an operation by the first operation signal is performed, the second operation signal via the second interface unit which does not have a priority higher than that of the first interface unit, the control unit performs exclusive control against the second operation signal.

10. The apparatus according to claim 9, wherein when the control unit receives, while the operation by the first operation signal is performed, a third operation signal via a third interface unit which has a priority higher than that of the first interface unit, the control unit suspends the operation by the first operation signal and starts an operation by the third operation signal.

11. The apparatus according to claim 1, wherein the first and second interface units include at least one of a main body button of the information processing apparatus, a remote controller, and a network.

12. The apparatus according to claim 1, wherein the electronic device is an image capturing apparatus that obtains a captured image by capturing a target, and
an operation signal for the image capturing apparatus is a signal which sets an image capturing condition of the image capturing apparatus including a condition of image processing to be performed on the captured image.

13. An information processing apparatus that controls an electronic device, comprising:
  a reception unit configured to receive an operation signal for the electronic device; and
  a control unit configured to perform exclusive control of not accepting, when a first operation signal has been received via a first interface unit, a second operation signal which has been received via a second interface unit,
  wherein, in accordance with a case in which the first operation signal is an operation signal related to a first function and a case in which the first operation signal is an operation signal related to a second function, the control unit changes a period of exclusive control against the second operation signal after an operation of the electronic device corresponding to the first operation signal has ended.

14. The apparatus according to claim 13, wherein when the first operation signal is the operation signal related to the first function, the control unit does not perform exclusive control against the second operation signal after the operation of the electronic device corresponding to the first operation signal has ended, and
  when the first operation signal is the operation signal related to the second function, the control unit performs, after the operation of the electronic device corresponding to the first operation signal has ended, exclusive control against the second operation signal until a predetermined period has elapsed.

15. An information processing method of an information processing apparatus that controls an electronic device, the information processing apparatus including a plurality of interface units each configured to receive an operation signal for the electronic device, the method comprising:
  performing, when a first operation signal has been received via a first interface unit of the plurality of interface units, exclusive processing not to accept a second operation signal which has been received via a second interface unit,
  wherein when the first operation signal is an operation signal related to a first function, the exclusive processing performs exclusive control against the second operation signal for a period from the start to the end of an operation of the electronic device corresponding to the first operation signal, and
  when the first operation signal is an operation signal related to a second function, the exclusive processing performs exclusive control against the second operation signal for the period from the start to the end of the operation of the electronic device corresponding to the first operation signal and a period until a predetermined time has elapsed since the operation of the electronic device corresponding to the first operation signal has ended.

16. A non-transitory computer-readable storage medium that stores a program for executing an information processing method of an information processing apparatus that controls an electronic device, the information processing apparatus including a plurality of interface units each configured to receive an operation signal for the electronic device, the method comprising:
  performing, when a first operation signal has been received via a first interface unit of the plurality of interface units, exclusive processing not to accept a second operation signal which has been received via a second interface unit,
  wherein when the first operation signal is an operation signal related to a first function, the exclusive processing performs exclusive control against the second operation signal for a period from the start to the end of an operation of the electronic device corresponding to the first operation signal, and
  when the first operation signal is an operation signal related to a second function, the exclusive processing performs exclusive control against the second operation signal for the period from the start to the end of the operation of the electronic device corresponding to the first operation signal and a period until a predetermined time has elapsed since the operation of the electronic device corresponding to the first operation signal has ended.

* * * * *